(12) United States Patent
McDonald et al.

(10) Patent No.: US 8,795,416 B2
(45) Date of Patent: Aug. 5, 2014

(54) SEGREGATED IN-SITU FORCED OXIDATION WET FLUE GAS DESULFURIZATION FOR OXYGEN-FIRED FOSSIL FUEL COMBUSTION

(75) Inventors: Dennis K. McDonald, Massillon, OH (US); Kevin J. Rogers, Wadsworth, OH (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 168 days.

(21) Appl. No.: 12/577,456

(22) Filed: Oct. 12, 2009

(65) Prior Publication Data

US 2011/0083592 A1 Apr. 14, 2011

(51) Int. Cl.
| | |
|---|---|
| *B01D 53/14* | (2006.01) |
| *B01D 53/79* | (2006.01) |
| *F23J 15/04* | (2006.01) |
| *B01D 53/50* | (2006.01) |
| *F23J 15/00* | (2006.01) |
| *B01D 53/80* | (2006.01) |
| *F23J 15/02* | (2006.01) |

(52) U.S. Cl.
CPC ............... *F23J 15/00* (2013.01); *B01D 53/79* (2013.01); *Y02E 20/344* (2013.01); *F23J 2219/50* (2013.01); *F23J 15/04* (2013.01); *B01D 53/501* (2013.01); *B01D 53/504* (2013.01); *F23J 2900/15061* (2013.01); *F23J 2215/20* (2013.01); *B01D 2251/11* (2013.01); *B01D 53/80* (2013.01); *F23J 15/025* (2013.01)
USPC ............. 95/235; 96/243; 110/203; 110/215; 110/234; 110/297; 423/243.02; 423/243.03; 423/243.01; 423/243.08; 423/243.12

(58) Field of Classification Search
USPC ............. 110/203, 215, 234, 297; 95/36, 151, 95/235; 96/239, 243, 234–235, 262, 265, 96/371; 423/243.01, 243.11, 243.12, 423/243.02, 243.03, 243.08
See application file for complete search history.

(56) References Cited

U.S. PATENT DOCUMENTS

| | | | |
|---|---|---|---|
| 4,539,184 A | | 9/1985 | Stehning |
| 5,209,905 A | * | 5/1993 | Onizuka et al. ............... 422/168 |

(Continued)

FOREIGN PATENT DOCUMENTS

| | | |
|---|---|---|
| GB | 2154468 A | 9/1985 |
| JP | 60227816 | 11/1985 |
| WO | 2008134613 A1 | 11/2008 |

OTHER PUBLICATIONS

Sara Jones, Oxy-Fuel Combustion in Coal-Fired Power Plants, University of Texas, Nov. 24, 2008, pp. 11 and 14.*
Doctor, Richard D. et al., High-sulfur Coal Desulfurization for Oxyfuels, 7th Annual Conference on Carbon Capture & Sequestration, May 5-8, 2008, Wednesday May 7, 2008, pp. 3, 5, 12, 19, 22, Pittsburgh, Pennsylvania, Argonne National Laboratory.

(Continued)

*Primary Examiner* — Duane Smith
*Assistant Examiner* — Cabrena Holecek
(74) *Attorney, Agent, or Firm* — Eric Marich; Christopher L. Smith

(57) ABSTRACT

An in-situ forced oxidation wet flue gas desulfurization apparatus, method and arrangement for utilization with oxy-fuel combustion power plants. The apparatus is a tower-like structure having a flue gas scrubbing zone and a reaction zone located subjacent to the gas scrubbing zone. A sulfur oxide absorbing liquid slurry is supplied to the gas scrubbing zone to react with and scrub the sulfur oxides from the flue gas. The partially reacted liquid slurry reagent and the scrubbed products drain into the reaction zone, rising to a set level. Oxidation air is introduced into the liquid slurry in the reaction zone to force the in-situ oxidation of sulfur compounds collected in the reaction zone. A wall separates and communicates the gas scrubbing zone and the reaction zone, the wall prevents the oxidation air from entering the gas scrubbing zone and extends into the liquid slurry below a nominal depth required to establish and maintain a liquid slurry seal thereby substantially precluding the leakage of flue gas into the reaction zone while allowing the partially reacted liquid slurry reagent and scrubbed products to drain into the reaction zone.

4 Claims, 5 Drawing Sheets

(56) References Cited

U.S. PATENT DOCUMENTS

| | | | | |
|---|---|---|---|---|
| 5,362,458 | A | * | 11/1994 | Saleem et al. ........... 423/243.06 |
| 5,451,250 | A | | 9/1995 | Gohara et al. |
| 5,494,614 | A | | 2/1996 | Gohara et al. |
| 5,779,999 | A | | 7/1998 | Laslo |
| 5,945,081 | A | * | 8/1999 | Kikkawa et al. ......... 423/243.01 |
| 7,771,685 | B2 | * | 8/2010 | Gal ........................ 423/243.06 |
| 2008/0267847 | A1 | | 10/2008 | Gal |

OTHER PUBLICATIONS

European Patent Office, Partial European Search Report, EP 10187158.0, dated Sep. 6, 2012.
European Patent Office, Extended European Search Report, EP 10187158.0, dated Nov. 27, 2012.
Intellectual Property Office of New Zealand, New Zealand Examination Report, Pat. Appl. No. 588508, dated Apr. 27, 2012.

* cited by examiner

SEGREGATED IN-SITU FORCED OXIDATION WET FLUE GAS DESULFURIZATION FOR OXYGEN-FIRED FOSSIL FUEL COMBUSTION

FIELD AND BACKGROUND OF THE INVENTION

The present invention relates, in general, to wet flue gas desulfurization (WFGD) systems and, in particular, to in-situ forced oxidation WFGD scrubber application in oxygen-fired fossil fuel combustion (oxy-fuel combustion).

Air quality laws, both at the federal and state level have set increasingly stringent emission standards. Often of particular concern are sulfur dioxide and other acidic gases produced by the combustion of fossil fuels and various industrial operations. Acidic gases are known to be hazardous to the environment, such that their emission into the atmosphere is closely regulated by clean air statutes.

New technologies are addressing this problem so that fossil fuels and particularly coal can be utilized for future generations without polluting the atmosphere and contributing to global warming. The method by which acidic gases are removed with a gas-liquid contactor or other type of flue gas scrubber is known as a WFGD system. One of the technologies being developed has potential for retrofit to existing pulverized coal plants, which are the backbone of power generation in many countries. This technology is oxy-fuel combustion which is the process of firing a fossil-fueled boiler with an oxygen-enriched gas mix instead of air. Almost all the nitrogen is removed from the input air, yielding a stream that is approximately 95% oxygen. Firing with pure oxygen would result in too high a flame temperature, so the mixture is diluted by mixing with recycled flue gas. The recycled flue gas can also be used to carry fuel into the boiler and ensure adequate convective heat transfer to all boiler areas. Oxy-fuel combustion produces approximately 75% less flue gas than air fueled combustion. Due to pipeline line and use constraints, it is highly desirable to produce a flue gas that is as high in concentration of carbon dioxide and as low in concentration of nitrogen, sulfur, oxygen and water, as practical. Therefore, air introduction into the flue gas must be minimized or eliminated.

In an oxy-fuel combustion plant, a WFGD system or wet scrubber can be utilized to remove as high as 99+% of the sulfur. In this process the sulfur dioxide containing flue gas is scrubbed with the calcium or sodium based alkaline slurry or slurry reagent which may include any number of additives to enhance removal, control chemistry, and reduce chemical scale. The slurry reagent, when contacted by sulfur dioxide, results in the absorption of the sulfur dioxide by the slurry and forms sulfites which are collected in a reaction tank. Thereafter, the slurry is oxidized to cause the alkali to react with the absorbed sulfur dioxide to yield a benign and often useful product. For example, in the case of desulfurization where calcium-based alkaline slurry, such as lime or limestone, is used to absorb sulfur dioxide, air is injected into the slurry collected in the reaction tank to oxidize the aqueous sulfite into sulfate; the latter will then react with calcium ions in the slurry to form gypsum, a marketable product. It should be noted that the above reaction is exemplary, and that the teachings of this invention are not limited to the use of calcium-based slurries in a desulfurization reaction.

The technology for wet scrubbing provides gas-liquid contact in a number of differently configured systems. In recent years, WFGD systems of the type commonly used with conventional air-fired fossil fuel plants and referred to as in-situ forced oxidation type have been the preferred systems for achieving oxidation. These systems comprise two major components: the absorber or gas scrubbing zone in which the actual flue gas scrubbing takes place, and the tank or reaction zone located subjacent to the gas scrubbing zone to allow for efficient utilization of the reagent. Some oxidation of sulfite to sulfate inevitably occurs in the gas scrubbing zone and is referred to as natural oxidation, so as to distinguish it from forced oxidation in which air is sparged through the slurry in the reaction tank. The sulfites must be oxidized to sulfates in order to maintain the reaction tank generally free of scale. In a conventional forced oxidation system, the air used to oxidize the sulfite bubbles through the slurry and is released into the incoming flue gas and exits the wet scrubber for discharge through a stack.

An example of a prior art in-situ forced oxidation WFGD tower is shown at 10 in FIG. 1, wherein untreated flue gas 11 is introduced through a flue gas inlet 12 located at the lower end of a gas scrubbing zone 14 and is caused to flow upwardly and to pass through a perforated tray 16 which promotes gas-liquid contact with the absorbent liquid slurry that is draining into a reaction zone or tank 18. The now partially treated flue gas continues in its upward flow and passes through a spray area 20 where it comes into gas-liquid contact with additional absorbent liquid slurry which is being injected into the gas scrubbing zone 14 by nozzles 22, and the liquid slurry absorbs sulfur dioxide still present in the partially treated flue gas. Thence, the flue gas 11 passes through the demisters or moisture separators 23 and is discharged as treated flue gas from a gas outlet 24 located at the upper end of the gas scrubber 10. The absorbent slurry injected by the nozzles 22 flows downward through the gas scrubbing zone 14 and through the perforated tray 16 where the sulfur dioxide is absorbed into the froth created by the interaction of the flue gas and slurry on the perforated tray 16. Thence the liquid slurry, which has now absorbed the sulfur dioxide from the untreated flue gas, drains into the reaction zone or tank 18 located at the bottom of the gas scrubber 10. The in-situ forced oxidation takes place in the reaction tank 18 when air 26 is injected into the calcium-based alkaline liquid slurry 27 by a sparger 28 and/or lance (not shown) to oxidize the calcium sulfite to calcium sulfate. Also within the reaction tank 18 are one or more mixers 30 located at a minimum elevation from the bottom of the sparger 28 set by the physical dimensions of the mixer blades and the horsepower of the mixer motor. The mixers 30 agitate the slurry in the reaction tank 18 to promote oxidation through mixing in the area under the sparger 28. The oxidation air 26 bubbles through the slurry and into the gas scrubbing zone 14 where it mixes with the flue gas passing through the gas scrubbing zone 14.

About 75% of the flue gas exiting the wet scrubber of an oxy-fuel combustion plant is returned to the boiler where oxygen is introduced to produce the combustion oxidant gas, while the remainder of the flue gas is sent to a compression and cleaning system where it is prepared for transport to the point of use or sequestration. Thus, it is imperative that the carbon dioxide concentration be as high as possible with as low a concentration of sulfur, nitrogen, oxygen, and water as can be practically and economically achieved. However, at this time, there are no known economically feasible methods or systems for providing in-situ forced oxidation flue gas scrubbing without allowing the oxidation air to enter the gas scrubbing zone, as required in the oxy-fuel combustion process in order to eliminate the introduction of nitrogen in the flue gas stream.

SUMMARY OF THE INVENTION

In accordance with the present invention a perforated wall or division plate both separates and communicates the gas scrubbing zone and the reaction zone of the WFGD tower, whereby absorbent liquid slurry can drain into the reaction zone, but the oxidation air in the reaction zone cannot enter the gas scrubbing zone, thereby preventing the introduction of nitrogen into the flue gas passing through the gas scrubbing zone.

The present invention provides an in-situ forced oxidation WFGD apparatus and method for utilization with oxy-fuel combustion plants. The flue gas desulfurization apparatus is comprised of a columnar or tower-like structure having an absorber or gas scrubbing zone and a tank or reaction zone located subjacent to the gas scrubbing zone. The flue gas derived from the oxy-fuel combustion process is passed through the gas scrubbing zone. A sulfur oxide absorbing liquid slurry is supplied to the gas scrubbing zone to react with and scrub the sulfur oxides from the flue gas. The partially reacted liquid slurry reagent and the scrubbed products drain into the reaction zone, rising to a set level, and oxidation air is introduced therein through a sparger to force the in-situ oxidation of sulfur compounds collected in the reaction zone. One or more mixers or impellers are located in the reaction zone below the sparger to agitate the liquid slurry and promote mixing in the vicinity of the sparger.

In accordance with the present invention; a wall separates and communicates the gas scrubbing zone and the reaction zone. The wall prevents the oxidation air in the reaction zone from mixing with the flue gas in the gas scrubbing zone. During operation of the WFGD tower, the gas scrubbing zone is under positive gas pressure, whereas the reaction zone is at atmospheric pressure, therefore, it is preferable for the wall to be seal-welded in gas tight manner to the WFGD tower shell. A nearly gas tight weld is acceptable; however some flue gas will leak into the reaction chamber and be vented with the oxidation air to atmosphere. The wall is structured and arranged to extend into the reaction zone liquid slurry, below a nominal depth required to establish and maintain a liquid slurry seal, thereby precluding the flue gas from entering the reaction zone, while allowing the partially reacted slurry reagent and the scrubbed products to drain from the gas scrubbing zone into the reaction zone.

In one embodiment of the invention, the wall includes a division plate which extends across the WFGD tower between the gas scrubbing zone and the reaction zone. The division plate is formed with one or more openings with each opening being connected to a respective drain pipe in a gas tight manner and sized to extend into the reaction zone liquid slurry below the nominal depth required to establish and maintain a liquid slurry seal.

In another embodiment of the invention, the wall is an annular division plate having a cross section which approximates an inverted frustocone with its converging end extending into the reaction zone liquid slurry below the nominal depth required to establish and maintain a liquid slurry seal.

In still another embodiment of the invention, the wall is an annular division plate having a cross section which approximates an inverted frustocone with its converging end facing the reaction zone. A downcomer drain pipe is connected to the converging end and extends into the reaction zone liquid slurry below the nominal depth required to establish and maintain a liquid slurry seal.

In accordance with the present invention there is provided a method for preventing oxidation air from mixing with the flue gas in an in-situ forced oxidation WFGD tower which includes a gas scrubbing zone and a reaction zone located subjacent to the gas scrubbing zone comprising the steps of: separating and communicating the gas scrubbing zone and the reaction zone; supplying a sulfur oxide absorbing reagent to the gas scrubbing zone; draining partially reacted liquid slurry reagent and scrubbed products from the gas scrubbing zone into the reaction zone; maintaining a set slurry level in the reaction zone and agitating the liquid slurry; establishing a liquid slurry seal between the gas scrubbing zone and the reaction zone; introducing oxidation air into the reaction zone to force the in-situ oxidation of sulfur compounds collected in the reaction zone; and venting the oxidation air from the reaction zone to atmosphere.

These and other features and advantages of the present invention will be better understood and its advantages will be more readily appreciated from the detailed description of the preferred embodiment, especially when read with reference to the accompanying drawings.

DESCRIPTION OF THE PREFERRED EMBODIMENT

Reference will hereinafter be made to the accompanying drawings wherein like numerals designate the same or functionally similar elements throughout the various figures.

The present invention resides in preventing the oxidation air in an in-situ forced oxidation WFGD tower from entering the gas scrubbing zone and mixing with the flue gas while allowing the partially reacted reagent and the scrubbed products to drain from the gas scrubbing zone into the reaction zone.

Figure 1:
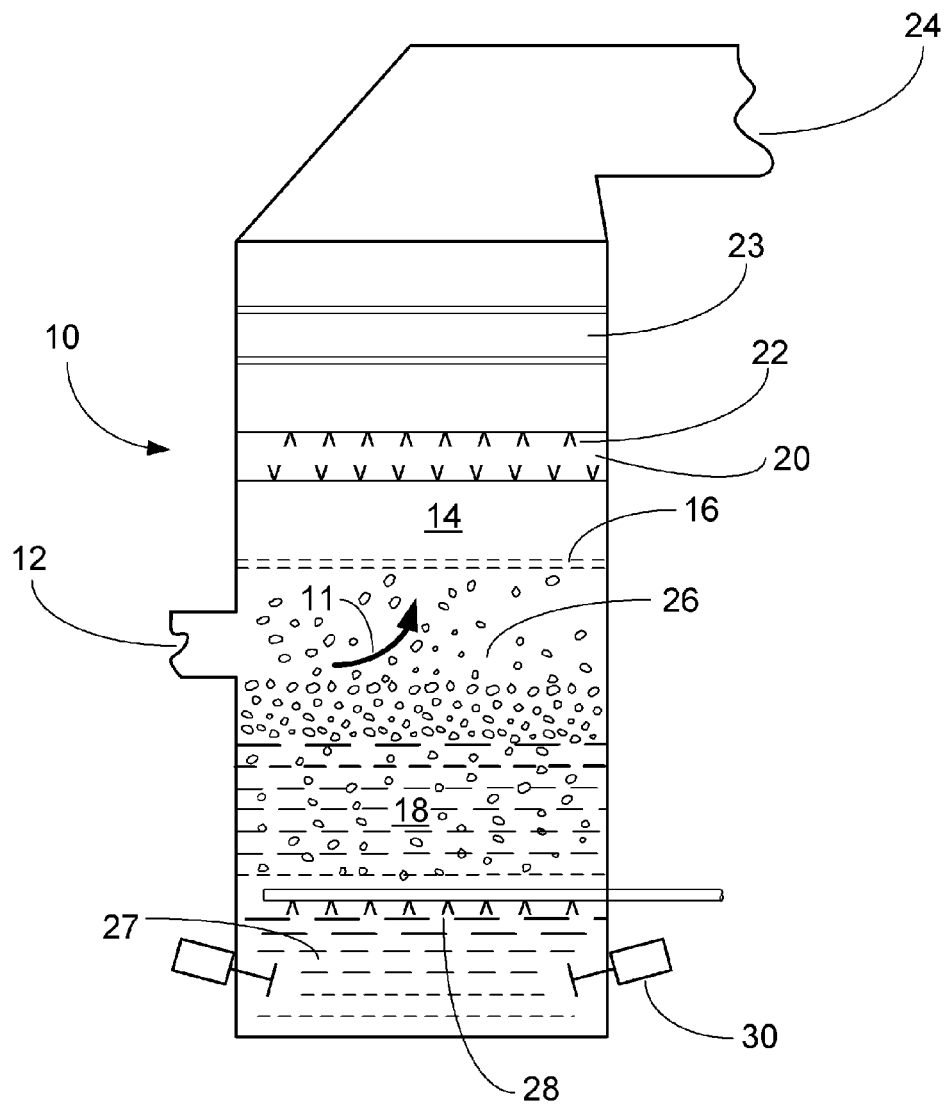
FIG. 1 is a sectional side view of a prior art in-situ forced oxidation WFGD tower.
Figure 2:
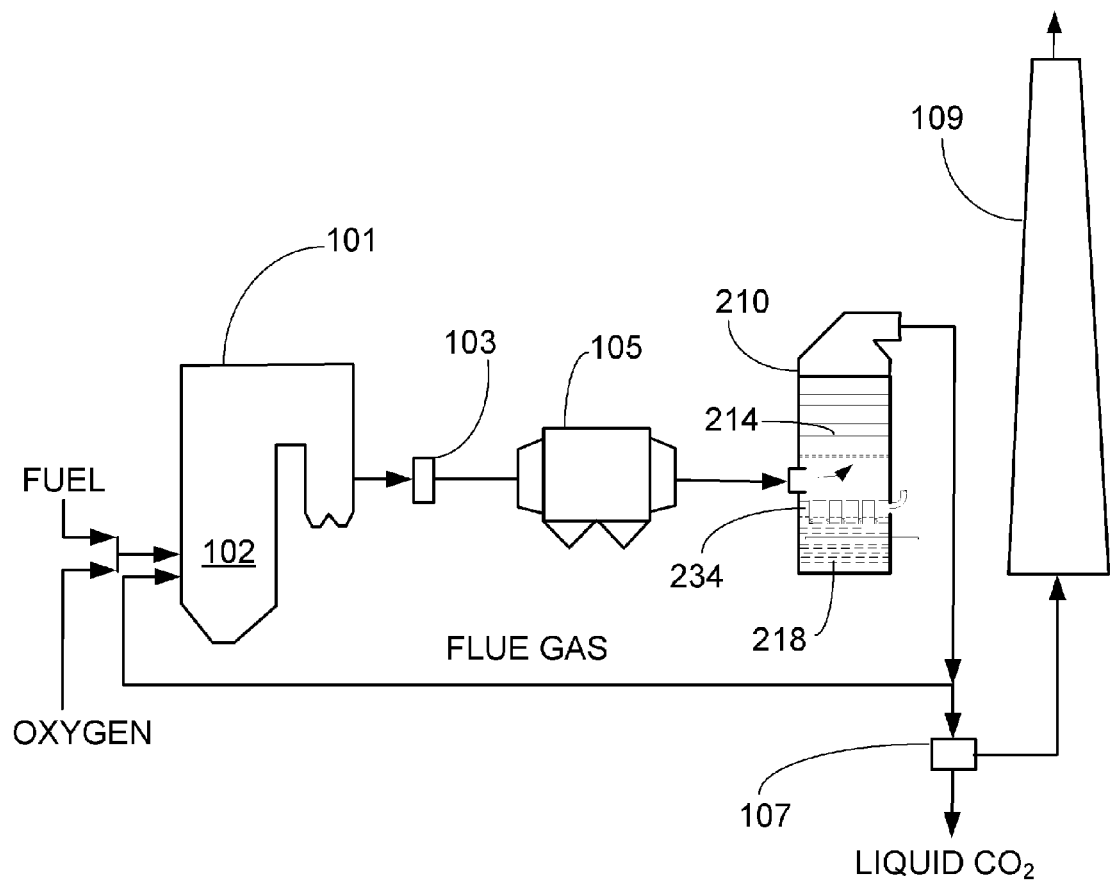
FIG. 2 is a flow diagram of an oxy-fuel fired boiler system including an in-situ forced oxidation WFGD tower of the present invention.
Figure 3:
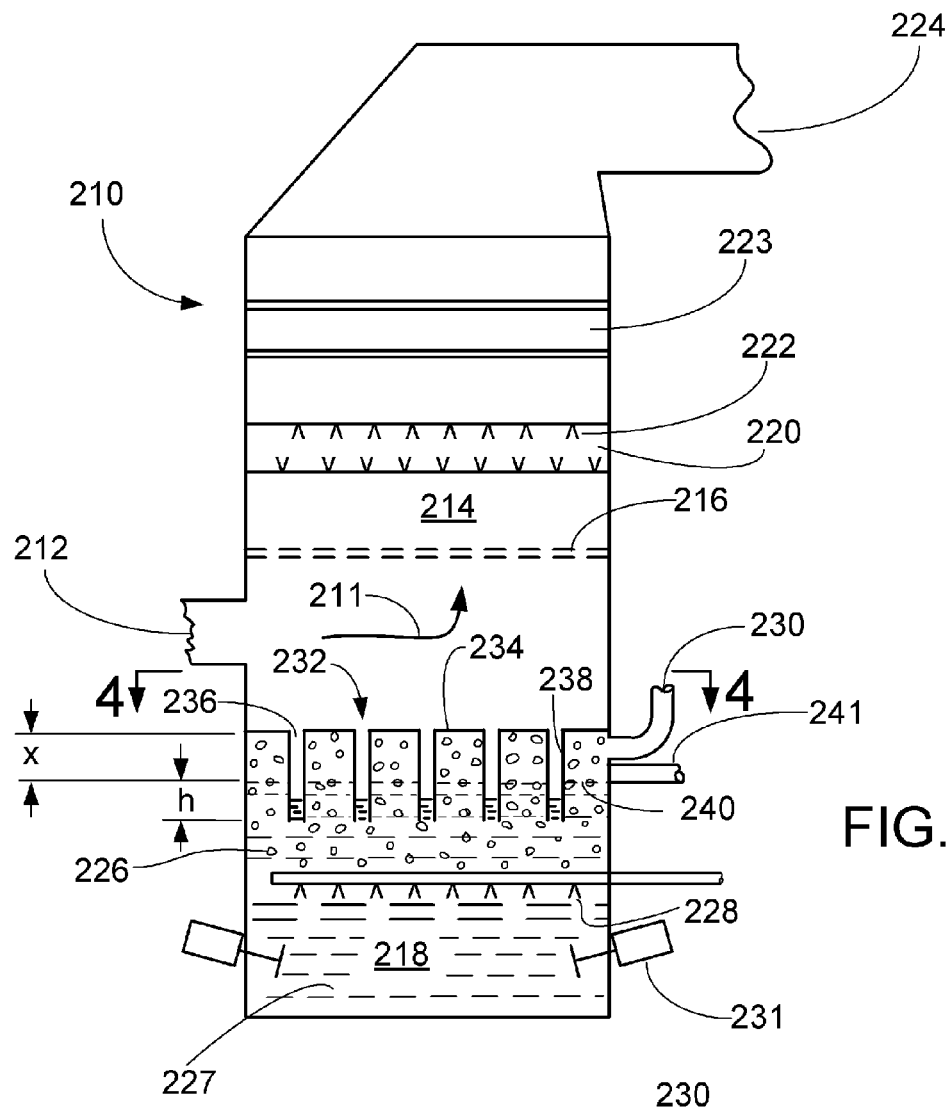
FIG. 3 is a sectional side view of an embodiment of an in-situ forced oxidation WFGD tower according to the present invention, wherein a perforated division plate separates the gas scrubbing zone and the reaction zone and includes pipes for draining partially reacted reagent and scrubbed products from the gas scrubbing zone into the reaction zone.

Referring to FIG. 2, there is shown an oxy-fuel fired system in combination with the in-situ forced oxidation WFGD tower of FIG. 3 by way of illustration only, and the alternative structural embodiments disclosed herein will be readily recognized as viable alternatives that may be employed with an oxy-fuel fired system.

Turning back to FIG. 2, there is shown, diagrammatically, a segment of a steam electric power plant which is provided with a wet scrubbing installation for treating flue gas in accordance with an embodiment of the present invention. As shown in FIG. 2, an oxy-fuel fired boiler 101 which burns pulverized coal in a mixture of oxygen and recirculated flue gas in a combustion chamber 102 to reduce the net volume of flue gases from the combustion process and to substantially increase the concentration of carbon dioxide in the flue gases, which enables the carbon dioxide to be captured in a cast effective manner. The flue gas that is discharged from the boiler 101 is delivered to a preheater 103. The flue gas leaving the preheater 103 is introduced into an electrostatic precipitator 105 or in some other dust separator such as a bag filter house. The flue gas exiting from the electrostatic precipitator 105 is conveyed to an in-situ forced oxidation WFGD tower 210 for the removal of sulfur oxides from the flue gas. In accordance with the present invention, the WFGD tower 210 includes a division plate 234 separating and communicating the gas scrubbing zone 214 and the reaction zone 218. About 75% of the flue gas exiting from the in-situ forced oxidation WFGD tower 210 is recycled to the boiler 101 to be mixed with oxygen thereby forming a combustion oxidant gas which is used in the burning of pulverized coal in the combustion chamber 102 of boiler 101. The remainder of the flue gas is sent to a compression and cleaning system 107 where it is prepared for transport or sequestration, for example, as liquid carbon dioxide, with any excess flue gas and gaseous elements being discharged through the stack 109 to atmosphere.

Referring to FIGS. 3-7, there is shown an in-situ forced oxidation WFGD tower 210 embodying the present invention, which is to provide an in-situ forced oxidation tower that is particularly suited for use with in an oxy-fuel combustion plant shown, for example, at FIG. 2 where it is imperative that the oxidation air required for the functioning of an in-situ forced oxidation WFGD tower be prevented from entering the flue gas scrubbing zone so as to eliminate the introduction of nitrogen in the flue gas stream and thus maintain the carbon dioxide concentration in the flue gas as high as possible.

The in-situ forced oxidation WFGD tower 210 shown in FIGS. 3-7 has a flue gas inlet 212 at the lower end of a gas scrubbing zone 214. The flue gas 211 enters the WFGD tower 210 through the inlet 212 and flows upwardly through a perforated tray 216 which promotes gas-liquid contact with the absorbent slurry draining from the spray area 220 to the reaction zone or tank 218. A group of nozzles 222 inject the absorbent liquid slurry or reagent into the spray area 220 of the gas scrubbing zone 214 to absorb the sulfur dioxide still present in the partially treated flue gas 211 as it passes through the spray area 220. The treated flue gas 211 continues its upward flow through the demisters or moisture separators 223 situated at the upper end of the gas scrubbing zone 214 to collect and coalesce the slurry droplets which are entrained in the flue gas 211 so that they will drain back down in the gas scrubbing zone 214. The flue gas 211 leaving the demisters 223 is discharged from the WFGD tower 210 through the gas outlet 224. The absorbent liquid slurry injected into the spray area 220 by the nozzles 222 absorbs sulfur dioxide from the flue gas 211 as it flows downward in a counter-current direction to the upward flow of the flue gas 211. The downward flowing slurry creates froth on the perforated division plate 216, and absorbs additional sulfur dioxide as it interacts with the flue gas 211. The liquid slurry continues to flow downward through the gas scrubbing zone 214 and into reaction zone or tank 218, located at the bottom of the gas scrubber 210. As the slurry is contacted by the sulfur dioxide in the flue gas 211, it loses its alkalinity and forms sulfites and bisulfites. In order to maintain the reaction zone or tank 218 free of scale, the sulfites in the alkaline liquid slurry 227 must be oxidized to sulfates. This oxidation is accomplished by forcing air 226 through one or more spargers 228 located above or below an agitator 231 in the reaction zone 218 to allow the air 226 to be bubbled therein to force oxidize the sulfites to sulfates. Optimally located spargers 228 further serve to aid solid suspension. The air 226 is thereafter discharged to atmosphere through one or more vent pipes 230 located at the upper end of the reaction zone or tank 218. One or more mixers or impellers 231 are provided in the reaction zone or tank 218 to promote mixing in the area under the sparger 228.

Air may alternatively be introduced via lances (not shown), either independent or in conjunction with spargers 228. Lances are preferably arranged around one or more agitator 231 for subsequent air dispersion in the reaction zone 218.

Figure 4:
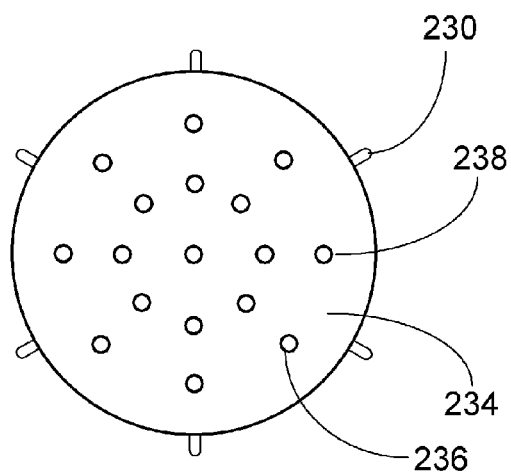
FIG. 4 is a sectional view taken along lines 4-4 of the in-situ forced oxidation WFGD tower shown in FIG. 3.

Referring particularly to FIGS. 3 and 4, there is shown an embodiment of the present invention whereby the air 226, which is introduced into the reaction zone 218 to oxidize the sulfites in the liquid slurry 227, is prevented from entering the gas scrubbing zone 214 and mixing with the flue gas 211. As shown in FIG. 3, the gas scrubbing zone 214 and the reaction zone 218 are separated by a perforated wall 232, which both separates and communicates the gas scrubbing zone 214 and the reaction zone 218. The wall 232 includes a perforated division plate 234 which extends laterally across the WFGD tower 210 between the gas scrubbing zone 214 and the reaction zone 218, and is attached the shell of the WFGD tower 210 at a distance "x" which is preferably about one to about two feet above the surface 240 of the liquid slurry in the reaction zone or tank 218. The level of liquid slurry in the reaction zone or tank 218 is regulated by an overflow line 241. The division plate 234 is formed with a plurality of openings 236 with each opening 236 being connected to a respective drain pipe 238 which is sized to extend into the liquid slurry 227 in the reaction zone 218 below the nominal depth required to establish and maintain a liquid slurry seal thereby precluding the leakage of flue gas into the reaction zone 218, while allowing the liquid slurry 227 to drain from the gas scrubbing zone 214 into the reaction zone 218. The depth "h" to which the drain pipe 238 must extend below the surface 240 of the liquid slurry in the reaction zone or tank 218, to establish and maintain a liquid slurry seal against the positive flue gas pressure above the division plate 234, depends on the flue gas pressure difference across the division plate 234 and the slurry density in the gas scrubbing zone 214; the higher the flue gas pressure, the deeper the penetration of the drain pipe 238 beneath the surface 240 of the liquid slurry, which is generally maintained at about atmospheric pressure.

Figure 5:
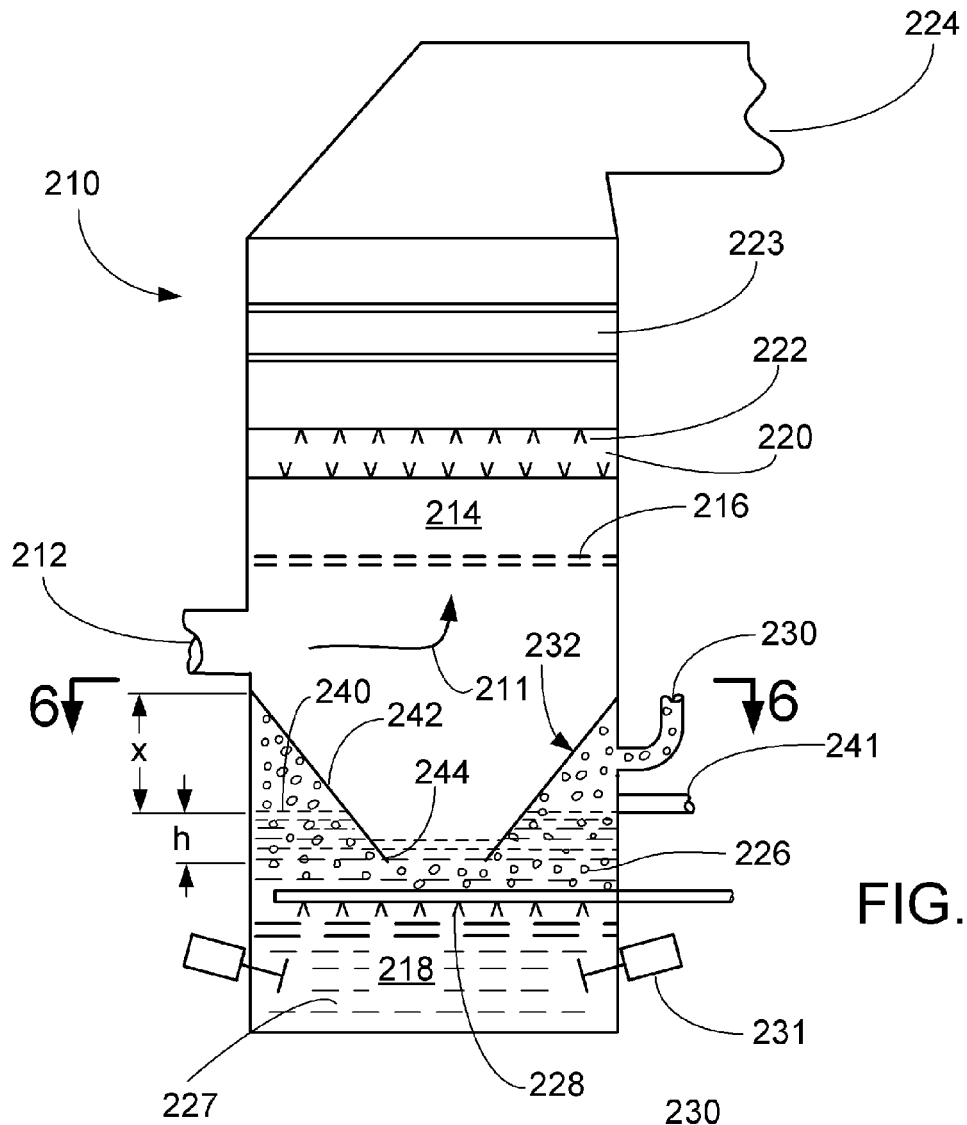
FIG. 5 is a sectional side view of an another embodiment of an in-situ forced oxidation WFGD tower according to the present invention, wherein a downwardly sloped annular division plate separates the gas scrubbing zone and the reaction zone, while draining partially reacted reagent and scrubbed products from the gas scrubbing zone into the reaction zone through its central opening.
Figure 6:
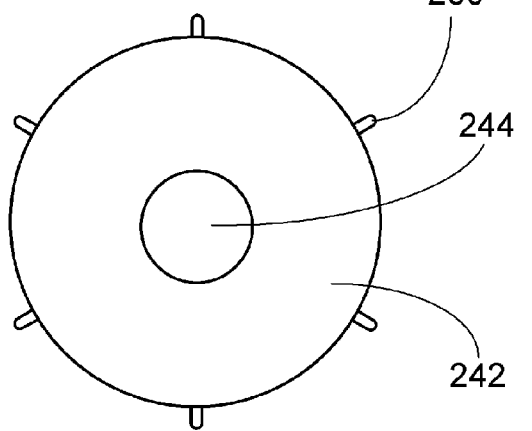
FIG. 6 is a sectional view taken along lines 6-6 of the in-situ forced oxidation WFGD tower shown in FIG. 5.

Referring to FIG. 3 and in particular to FIGS. 5 and 6, there is shown another embodiment of the present invention where the gas scrubbing zone 214 and the reaction zone 218 are separated by an annular division plate 242 having a cross section which approximates an inverted frustocone with its converging end 244 extending beneath the surface 240 of the liquid slurry in the reaction zone 218 to a sufficient depth "h", to establish and maintain a liquid slurry seal against the positive flue gas pressure above the annular division plate 242.

Figure 7:
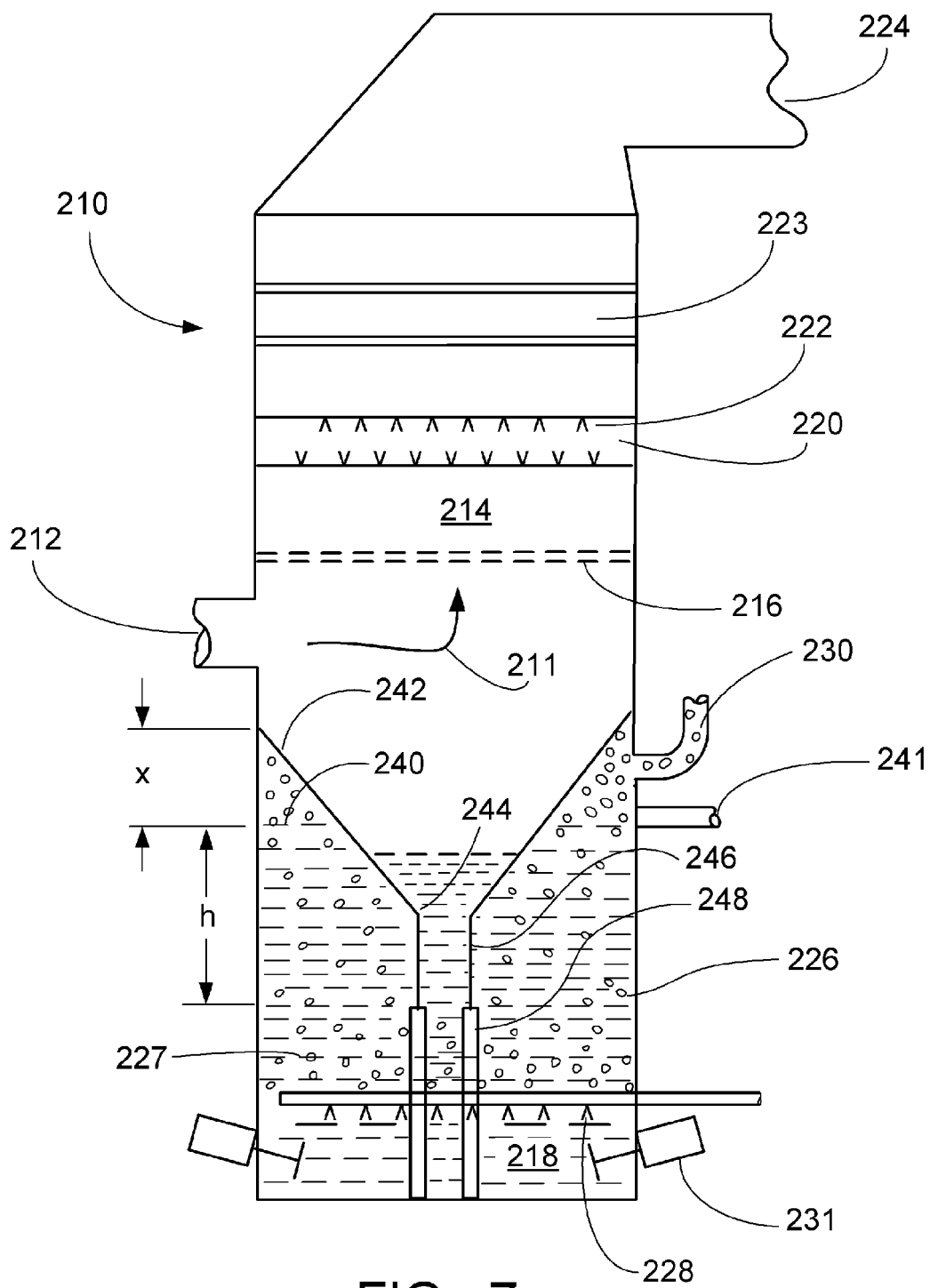
FIG. 7 is a sectional side view of still another embodiment of an in-situ forced oxidation WFGD tower according to the present invention, wherein a downwardly sloped annular division plate separates the gas scrubbing zone and the reaction zone, while draining partially reacted reagent and scrubbed products from the gas scrubbing zone into the reaction zone through a downcomer connected to its central opening.

Referring to FIG. 3 and in particular to FIG. 7, there is shown still another embodiment of the present invention where the gas scrubbing zone 214 and the reaction zone 218 are separated by an annular division plate 242 having a cross section which approximates an inverted frustocone with its converging end 244 facing the reaction zone 218. A downcomer drain pipe 246 is connected to the converging end 244 and extends beneath the surface 240 of the liquid slurry in the reaction zone 218 to a sufficient depth "h", to establish and maintain a liquid slurry seal against the positive flue gas pressure above the division plate 242. The downcomer drain pipe 246 rests on support structure 248. In a preferred embodiment the cross-sectional profile of downcomer drain pipe 246 is sized to produce a downward slurry flow velocity greater than the upward velocity of air bubble to assist in the preventing air from entering the absorption zone though the downcomer drain pipes 246.

While specific embodiments of the invention have been shown and described in detail to illustrate the application of the principles of the invention, it will be understood that the invention may be embodied otherwise without departing from such principles. For example, the present invention may be applied in new construction involving oxy-fuel combustion systems, or to the replacement, modification or retrofitting of existing air fueled combustion systems which are to be converted into oxy-fuel combustion systems. Thus, while the present invention has been described above with reference to particular means, materials, and embodiments, to illustrate the application of the principles of the invention, it is to be understood that this invention may be varied in many ways without departing from the spirit and scope thereof, and therefore is not limited to these disclosed particulars but extends instead to all equivalents within the scope of the following claims.

We claim:

1. A calcium-based, in-situ forced oxidation, gas-liquid contact apparatus for removing sulfur oxides from flue gas from an oxy-fuel combustion process, comprising:
    a tower having a gas inlet and a gas outlet;
    a gas scrubbing zone located between the inlet and the outlet, the gas scrubbing zone adapted to receive a calcium-based sulfur oxide absorbing liquid slurry reagent;
    means for supplying the calcium-based sulfur oxide absorbing liquid slurry reagent to the gas scrubbing zone;
    a reaction zone located within the tower subjacent to the gas scrubbing zone for collecting partially reacted liquid slurry reagent and scrubbed products from the gas scrubbing zone, the reagent and scrubbed products rising to a set level in the reaction zone;
    means for introducing oxidation air into the liquid slurry reagent in the reaction zone to force the in-situ oxidation of sulfur compounds collected in the reaction zone;
    a wall separating and communicating the gas scrubbing zone and the reaction zone, the wall preventing the oxidation air in the reaction zone from entering and mixing with the flue gas in the gas scrubbing zone, the wall extending into the liquid slurry reagent below a nominal depth required to establish and maintain a liquid slurry seal thereby substantially precluding the leakage of flue gas into the reaction zone while allowing the partially reacted liquid slurry reagent and scrubbed products to drain into the reaction zone;
    wherein the wall includes a perforated plate member extending across the tower between the gas scrubbing zone and the reaction zone;
    wherein the wall includes at least one drain pipe mounted on the plate member and extending into the liquid slurry reagent below said nominal depth; and
    including means for venting the oxidation air from the reaction zone to atmosphere.

2. The gas-liquid contact apparatus according to claim 1, wherein the wall includes an annular plate member having a cross section which approximates an inverted frustocone with its converging end extending into the liquid slurry below said nominal depth.

3. The gas-liquid contact apparatus according to claim 1, wherein the wall includes an annular plate member having a cross section which approximates an inverted frustocone with its converging end facing the reaction zone, a downcomer drain pipe connected to the converging end and extending into the liquid slurry below said nominal depth.

4. The apparatus according to claim 1, wherein the cross-sectional profile of the drain pipe is sized to produce a downward slurry flow velocity greater than the upward velocity of air bubble to assist in the preventing air from entering an absorption zone through the drain pipes.

* * * * *